US 7,437,601 B1

(12) United States Patent
Manley et al.

(10) Patent No.: US 7,437,601 B1
(45) Date of Patent: Oct. 14, 2008

(54) METHOD AND SYSTEM FOR RE-SYNCHRONIZING AN ASYNCHRONOUS MIRROR WITHOUT DATA LOSS

(75) Inventors: Stephen Manley, Pleasanton, CA (US); Kiyoshi Komatsu, San Mateo, CA (US)

(73) Assignee: Network Appliance, Inc., Sunnyvale, CA (US)

( * ) Notice: Subject to any disclaimer, the term of this patent is extended or adjusted under 35 U.S.C. 154(b) by 606 days.

(21) Appl. No.: 11/075,640

(22) Filed: Mar. 8, 2005

(51) Int. Cl.
*G06F 11/00* (2006.01)
(52) U.S. Cl. .......................................... 714/6; 711/162
(58) Field of Classification Search .................. None
See application file for complete search history.

(56) References Cited

U.S. PATENT DOCUMENTS

| | | | |
|---|---|---|---|
| 6,654,912 B1 * | 11/2003 | Viswanathan et al. | 714/42 |
| 6,691,245 B1 * | 2/2004 | DeKoning | 714/6 |
| 7,055,057 B2 * | 5/2006 | Achiwa | 714/6 |
| 7,065,589 B2 * | 6/2006 | Yamagami | 709/246 |
| 7,143,249 B2 * | 11/2006 | Strange et al. | 711/162 |
| 7,225,307 B2 * | 5/2007 | Micka et al. | 711/161 |
| 7,263,590 B1 * | 8/2007 | Todd et al. | 711/165 |
| 7,318,133 B2 * | 1/2008 | Yagawa et al. | 711/162 |
| 2003/0126388 A1 * | 7/2003 | Yamagami | 711/162 |
| 2004/0250034 A1 * | 12/2004 | Yagawa et al. | 711/162 |
| 2004/0260873 A1 * | 12/2004 | Watanabe | 711/114 |
| 2005/0071708 A1 * | 3/2005 | Bartfai et al. | 714/5 |
| 2005/0177693 A1 * | 8/2005 | Nahum | 711/162 |
| 2005/0251633 A1 * | 11/2005 | Micka et al. | 711/162 |
| 2007/0061616 A1 * | 3/2007 | Watanabe | 714/6 |
| 2007/0094467 A1 * | 4/2007 | Yamasaki | 711/162 |
| 2007/0234105 A1 * | 10/2007 | Quinn et al. | 714/6 |
| 2007/0234106 A1 * | 10/2007 | Lecrone et al. | 714/6 |
| 2007/0234108 A1 * | 10/2007 | Cox et al. | 714/6 |
| 2008/0065843 A1 * | 3/2008 | Bartfai et al. | 711/162 |
| 2008/0126725 A1 * | 5/2008 | Morishita et al. | 711/162 |

* cited by examiner

*Primary Examiner*—Christopher S McCarthy
(74) *Attorney, Agent, or Firm*—Blakely, Sokoloff, Taylor & Zafman LLP.

(57) ABSTRACT

A method and system for re-synchronizing a broken asynchronous data mirror while preserving data that is unique to either a first volume or second volume making up the mirror are disclosed. According to an embodiment of the present invention, a common data recovery point is determined. Based on the common data recovery point, data unique to a first volume is identified and sequestered by, for example, copying the unique data to a third volume on a re-synchronization data storage device. Next, that unique data is eliminated. Finally, data unique to the second volume is identified based on the common data recovery point. The data unique to the second volume is copied to the first volume, thereby synchronizing the two volumes.

24 Claims, 6 Drawing Sheets

METHOD AND SYSTEM FOR RE-SYNCHRONIZING AN ASYNCHRONOUS MIRROR WITHOUT DATA LOSS

TECHNICAL FIELD

The present invention relates generally to the field of data storage systems. More particularly, the present invention relates to a method and system for re-synchronizing an asynchronous data mirror without data loss.

BACKGROUND

Despite the high reliability of modern day storage devices, it is still critically important for enterprises to put into place systems for automatically backing up important data. Data backup systems allow for quick data recovery in the event that a primary storage device fails. Accordingly, such systems are an important part of any disaster recovery plan. Furthermore, in many industries, such as the financial services and healthcare industries, some enterprises are compelled by strict records-retention regulations to archive important data, including: emails, documents, patient records, audit information, as well as other types of data. In some cases, regulations require that the archived data be stored on WORM (write-once, read-many) media, and be readily available upon request.

To ensure the availability of the data required by records-retention regulations, enterprises utilize asynchronous data mirroring. Generally, an asynchronous data mirroring system is a data storage system having two storage devices, for example, a primary storage device and a backup storage device, sometimes referred to as a target storage device. The asynchronous data mirroring system is configured so that periodically, the backup storage device is synchronized with the primary storage device. That is, the new data from the primary storage device is periodically copied to the backup storage device. Consequently, at any time between synchronization operations, the data on the two storage devices may differ.

One of the problems with asynchronous data mirroring is re-synchronizing a primary storage device and secondary storage device after the mirror has been broken (e.g., the devices have become unsynchronized). For example, as is often the case when a primary storage device fails, the secondary storage device is reconfigured to take the place of the former primary storage device until the problem with the primary storage device can be repaired. However, once the primary storage device has been repaired, it is often difficult, if not impossible, to re-synchronize the data on the two devices.

FIGS. 1 and 2 illustrate an example of this type of problem. FIG. 1 illustrates a timing diagram 10 for an asynchronous data mirroring system. In FIG. 1, the horizontal line at the bottom of the figure with reference number 12 represents time, and the horizontal line with reference number 14 represents the state of a primary storage device over time. For example, moving from left to right on line 14 represents the passing of time, during which application data may be written to a volume on the primary storage device. Similarly, the horizontal line with reference number 16 represents the state, over time, of a backup storage device. In this example, the backup storage device is configured to asynchronously mirror the data of the volume on the primary storage device.

The storage system that is the subject of the timing diagram illustrated in FIG. 1 is configured so that, periodically, a "snapshot" of the volume on the primary storage device is captured and written to a snapshot backup volume on the primary storage device. A snapshot is an incremental backup image in which only data (e.g., disk blocks) that has changed since a previous backup image is captured. Each snapshot operation 18 is represented in FIG. 1 by a circular dot along the horizontal line 14 and 16. Similarly, on a periodic basis, data from the volume on the primary storage device is asynchronously copied, or "mirrored", to a volume on the backup storage device. This mirror synchronization operation 20 is represented in FIG. 1 by the vertical arrows beginning at reference line 14 and pointing to reference line 16.

Referring now to the time line 12, between time A and time B, twelve snapshots 18 of the volume on the primary storage device are written to the snapshot backup volume on the primary storage device, and three mirror synchronization operations 20 are performed. Consequently, at time B, the mirror volume on the backup storage device is perfectly synchronized with the volume on the primary storage device. At time C, a snapshot of the primary storage device is captured and written to the snapshot backup volume on the primary storage device. Shortly thereafter, at time D, the primary storage device fails. Therefore, at time D, the primary storage device is out of sync with the backup storage device, because the primary storage device contains data that was written after the last successful mirror synchronization operation at time B.

If, as is often the case, the backup storage device is reconfigured to take the place of the primary storage device, then, beginning at time D, application data will be written to the backup storage device. In addition, at time E, a snapshot of the backup storage device may be written to a snapshot backup volume on the backup storage device. Consequently, at time F, when the primary storage device is repaired, the primary storage device and the backup storage device will be out of sync, as each will include data that is unique.

FIG. 2 illustrates a directory tree 22 for a volume on the primary 24 and backup storage devices 26 after the asynchronous data mirror has been broken. As illustrated in FIG. 2, the volume on the primary storage device 24 is out of sync with the volume on the backup storage device 26. The volume on the primary storage device 24 includes the files with filenames FOO_CRITICAL and FOO_BAR, while the volume on the backup storage device 26 does not. These two files were created after the final successful replication synchronization. Similarly, the volume on the backup storage device 26 includes the file with the filename FILE_CRITICAL, while the primary storage device 24 does not. This file, FILE_CRITICAL, was created after the mirror had broken.

There are multiple approaches to re-synchronizing broken mirrors. One solution for re-synchronizing the two devices is to have one device overwrite the other. That way, both devices contain the same set of data, and changes can continue to be mirrored over. However, this results in lost data because the unique data on one system is eradicated in the process. For example, if the backup storage device 26 is selected to overwrite the primary backup storage device 24, then the files on the primary storage device 24 with the filenames FOO_CRITICAL and FOO_BAR will be deleted. Similarly, if the primary storage device 24 is selected to overwrite the backup storage device 26, then the file on the backup storage device 26 with the filename FILE_CRITICAL will be deleted. Data loss is never a good thing, but in some cases, losing data is simply not an option.

Another solution is to require users to manually resolve the differences between the two systems. Unfortunately, this is frequently not possible. If one file has been modified on both systems, the user may not be able to create an authoritative combination of the data sets. There may simply be two conflicting, unique versions of a file that both need to be saved to avoid data loss.

SUMMARY OF THE DESCRIPTION

A method and system for re-synchronizing an asynchronous data mirror without data loss are disclosed. According to an embodiment of the invention, all data unique to a first volume of a broken asynchronous data mirror is sequestered while preserving the data's attributes. Next, data unique to a second volume is copied to the first volume.

Other aspects of the invention will be apparent from the accompanying figures and from the detailed description that follows.

BRIEF DESCRIPTION OF THE DRAWINGS

The present invention is illustrated by way of example, and not by way of limitation, in the figures of the accompanying drawings, in which like references indicate similar elements, and in which.

DETAILED DESCRIPTION

A method and system for re-synchronizing an asynchronous data mirror without data loss are described. In the following description, for purposes of explanation, numerous specific details are set forth in order to provide a thorough understanding of the present invention. It will be evident, however, to one skilled in the art that the present invention may be practiced without these specific details.

The present invention is advantageous, in part, because it provides the ability to automatically re-synchronize a broken asynchronous data mirror while preserving data that is unique to either volume making up the mirror. For example, often when two volumes configured as a data mirror become out of sync with one another, one volume, or both volumes, will end up with unique data (e.g., data on one volume and not the other). In the prior art, re-synchronizing the two volumes has generally been accomplished at the expense of losing data that was unique to one or the other of the two volumes. Alternately, other art suggested making a duplicate copy of the entire volume of data, frequently to an alternate media with different access and permanence properties. However, the present invention provides a computer implemented method and system for re-synchronizing a broken asynchronous data mirror, while preserving only the data unique to either of the two volumes making up the data mirror in a manner than maintains the original access and permanence characteristics. While the present invention is a particularly useful solution to the challenges created by records-retention regulations, the present invention may be equally useful in a wide variety of other data storage applications.

Figure 1:
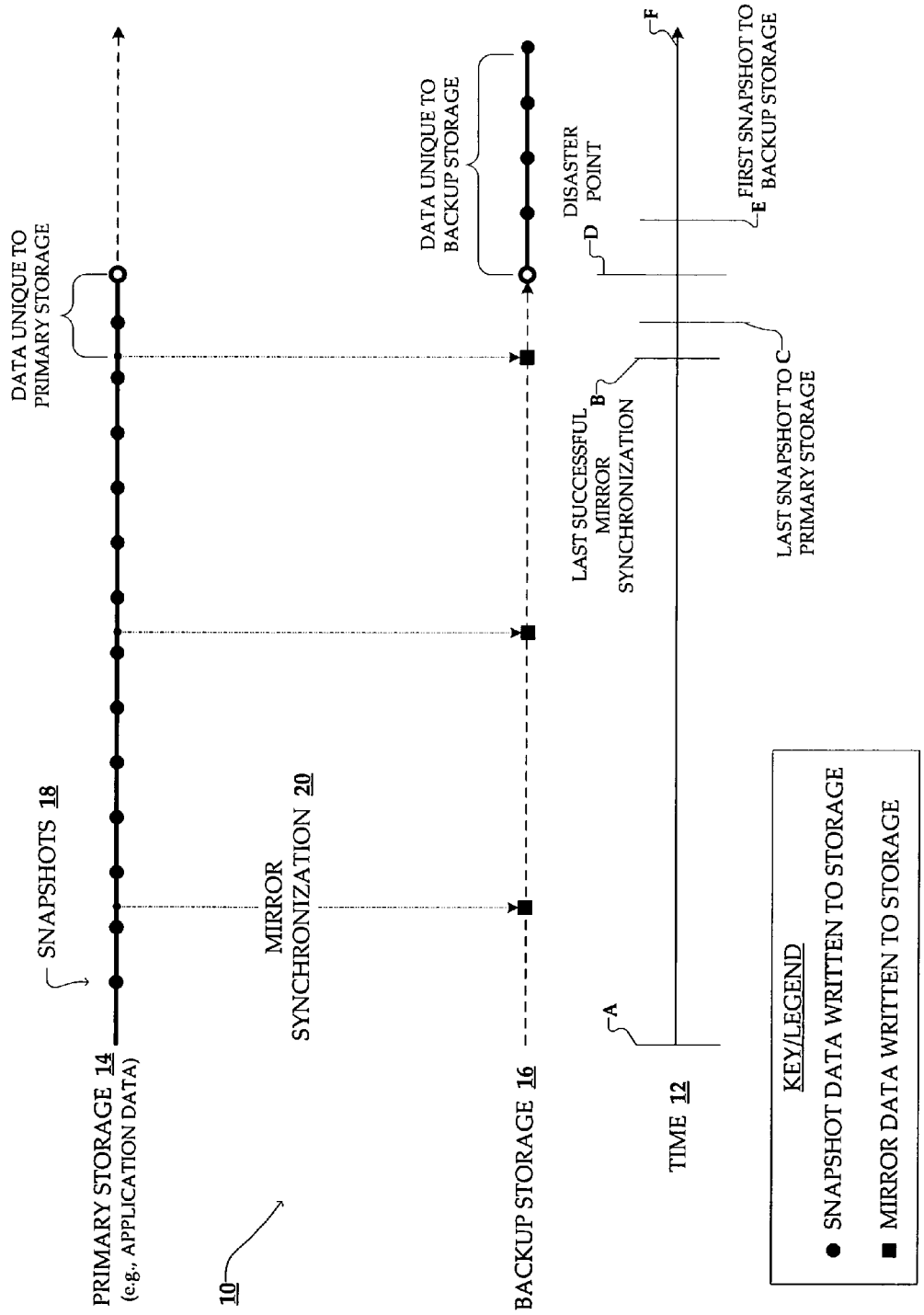
FIG. 1 illustrates a timing diagram for an asynchronous data mirroring system.
Figure 2:
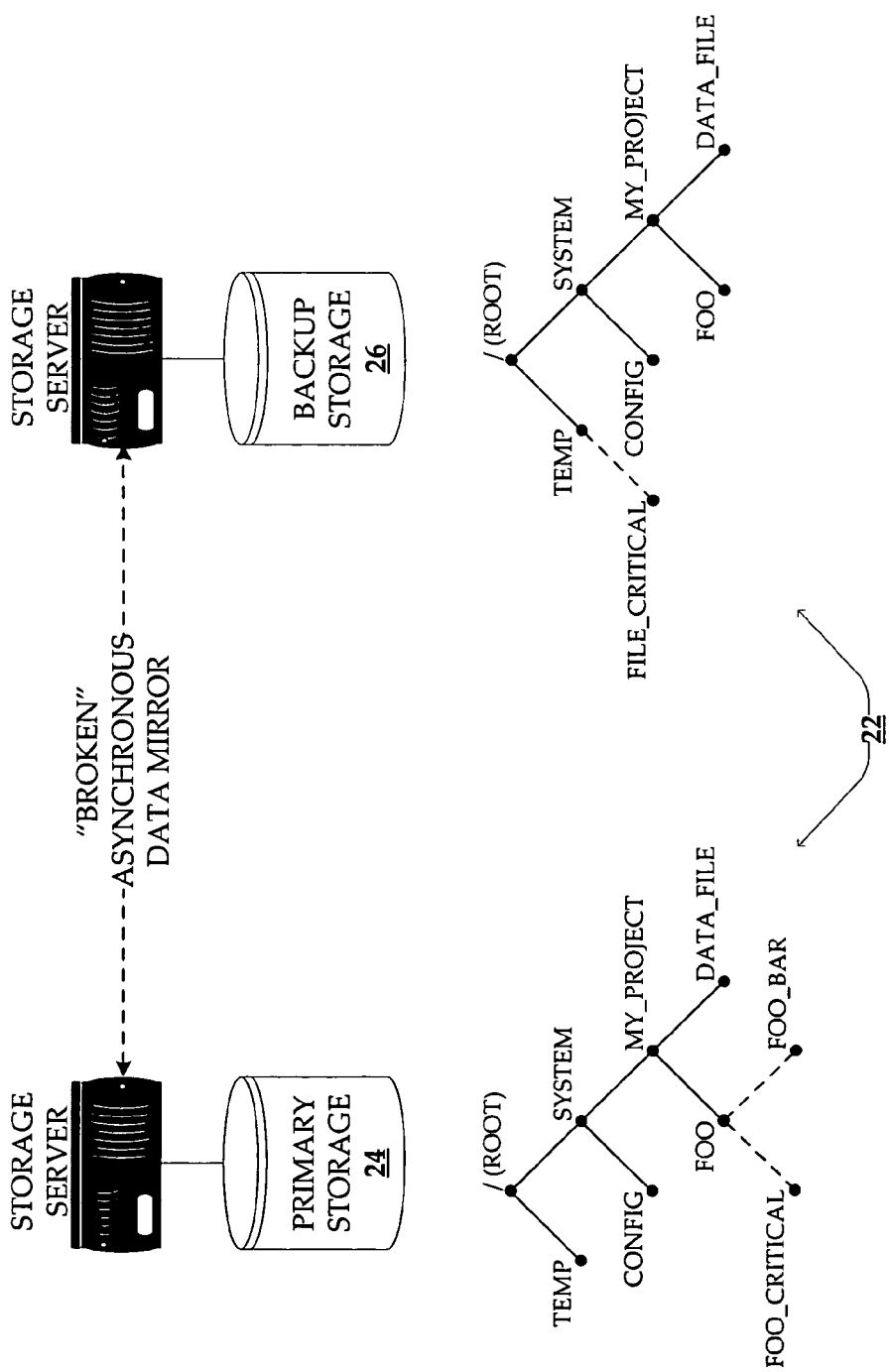
FIG. 2 illustrates a directory tree for a volume on a primary and a secondary backup storage device after an asynchronous data mirror has been broken.
Figure 3:
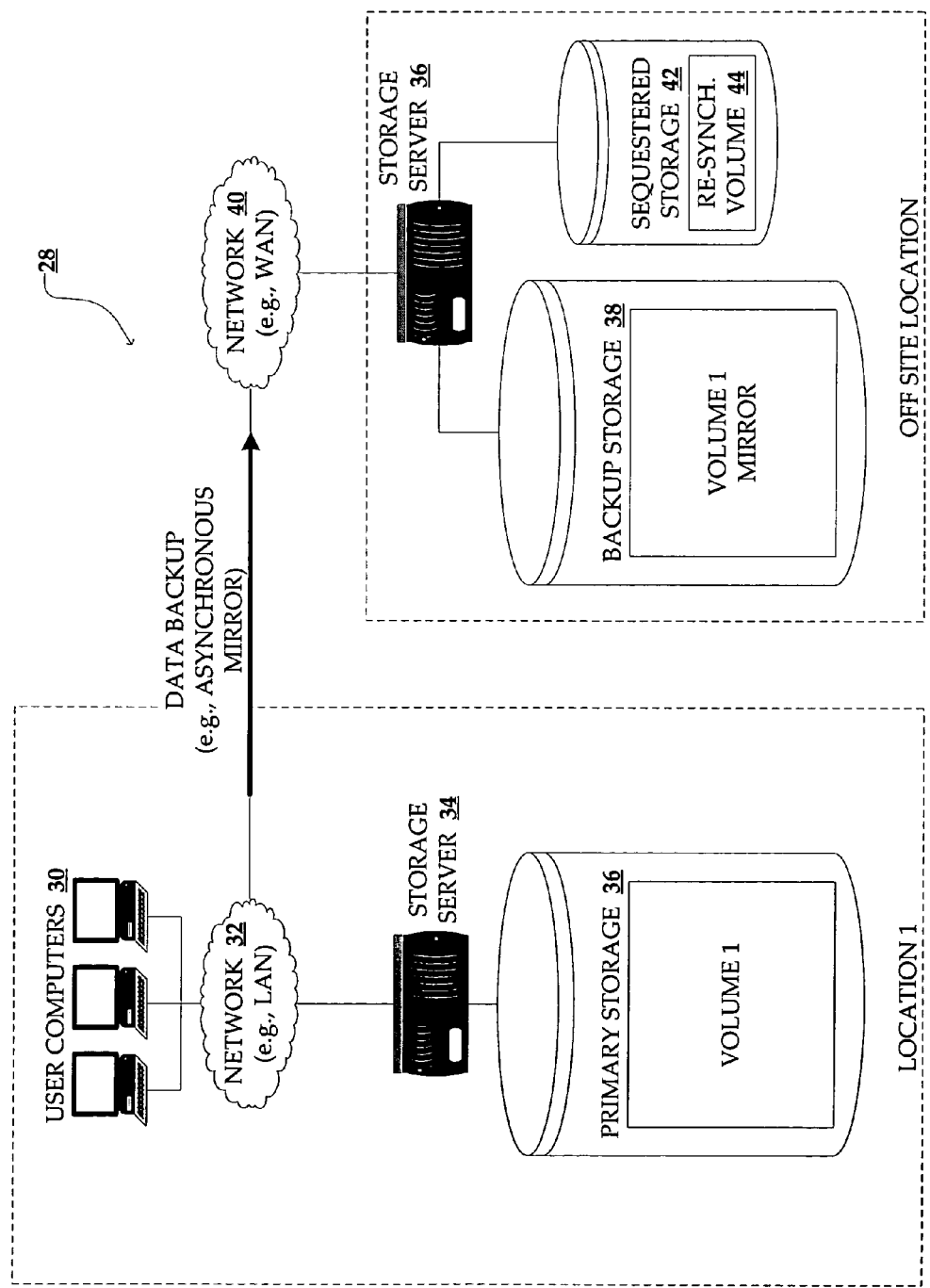
FIG. 3 illustrates an example of a network environment with a data storage system configured for asynchronous data mirroring, according to an embodiment of the invention.

FIG. 3 illustrates a network environment 28 with an example of a data storage system configured for asynchronous data mirroring, according to an embodiment of the invention. As illustrated in FIG. 3, several user computers 30 are connected via a network 32 to a storage server 34 with a primary storage device 36. Applications executing on the user computers 30 may store application data (e.g., emails, documents, etc.) on the primary storage 36 of the storage server 34.

In addition, the system illustrated in FIG. 3 includes an off-site secondary storage server 36 connected to the primary storage server 34 via a wide area network (WAN) 40. The secondary storage server 36 is connected to a backup storage device 38. The backup storage device 38 of the secondary storage server 36 may be configured to "mirror" a volume (e.g., volume 1) on the primary storage server 34. Finally, the data storage system includes a sequestered storage device 42 attached to the secondary storage server 36, to be used for storing unique data when re-synchronizing with the primary storage server 34.

In one embodiment of the invention, each storage server 34 and 36 may be a network attached storage device (NAS), such as a filer from Network Appliance, Inc. of Sunnyvale, Calif. Accordingly, the storage server with reference number 34 may be configured to execute a records-retention application (e.g., a data archiving application), such as SnapLock®, also from Network Appliance, Inc. of Sunnyvale, Calif. As such, the storage server 34 may be configured to periodically take "snapshots" of data blocks on the primary storage 36, and copy the data to backup storage. In one embodiment, the data is written to a SnapLock® WORM (write-once, read-many) volume on the primary storage server 34, so that the data is both unalterable, and readily available. Furthermore, each storage device may be any type of mass storage device, including, but not limited to: electromagnetic disk drives, optical disk drives and/or tape drives.

According to one embodiment of the invention, the storage server with reference number 34 may execute an asynchronous data mirroring application, such as SnapMirror® also from Network Appliance, Inc. of Sunnyvale, Calif. Accordingly, the storage server 34 may be configured to "mirror" data from a WORM volume to a WORM volume on the backup storage server 36.

It will be appreciated that the particular configuration of the data storage system illustrated in FIG. 3 is provided only as an example. The present invention may be adapted to, and utilized with, a wide variety of data storage systems, and software applications other than those specifically described herein. For example, in an alternative embodiment of the invention, the primary storage 36 and the backup storage 38 may be connected to a single storage server, and that storage server may execute both a records-retention application (e.g., SnapLock®) and an asynchronous data mirroring application (e.g., SnapMirror®). Similarly, in one embodiment of the invention, the sequestered storage 42 may be connected to the secondary storage server 36 (as illustrated in FIG. 3), or the primary storage server 34, or alternatively, a third storage server (not shown). In addition, it will be appreciated that in another embodiment, multiple storage devices may be attached to a storage server and a volume may span multiple storage devices. For example, in one embodiment of the invention, one or more of the storage devices 36, 38 or 42 may be implemented as a storage area network (SAN) connected to each storage server 34 and 36 via a data switching device, such as a fibre channel data switch. Accordingly, each storage server 34 and 36 may be a specialized device capable of providing client applications executing on the user computers 30 block level access to the storage devices making up the SAN.

According to one embodiment of the invention, to re-synchronize a broken asynchronous data mirror (e.g., a data mirror having unique data on both volumes), an administrator may execute a re-synchronization application on the primary storage server 34 where the asynchronous data mirror was originally configured. In one embodiment of the invention, the re-synchronization application may be tightly integrated with the asynchronous data mirroring application, or alternatively, the re-synchronization application may be a loosely integrated add-on component.

In any case, to re-synchronize a broken asynchronous data mirror without overwriting any data unique to one volume or the other, in one embodiment of the invention, the re-synchronization application may sequester all data unique to a first volume on a first storage device, before eliminating that unique data and copying all data unique to a second volume on a second storage device to the first volume on the first storage device. For example, the re-synchronization application may sequester all unique data on a volume (e.g., volume 1 mirror) on the backup storage 38 by copying the unique data from the volume to another volume (e.g., re-synchronization volume 44) on the sequestered storage device 42. The re-synchronization application may eliminate that unique data from the backup storage 38 volume 1 mirror because it has been properly saved elsewhere. It can then re-synchronize the broken data mirror by copying all unique data from volume 1 of the primary storage device 36 to the backup storage device 38. Because all of the data unique to the volume 1 mirror on the backup storage device 38 was previously copied to the re-synchronization volume 44 of the sequestered storage device 42, the re-synchronization operation does not result in the loss of data when data on the volume of the backup storage device 38 is overwritten by data from the primary storage device 36. Furthermore, by integrating this process into the resynchronization procedure, data cannot be lost and can be stored in a way that maintains the access and permanence characteristics of that data.

Figure 4:
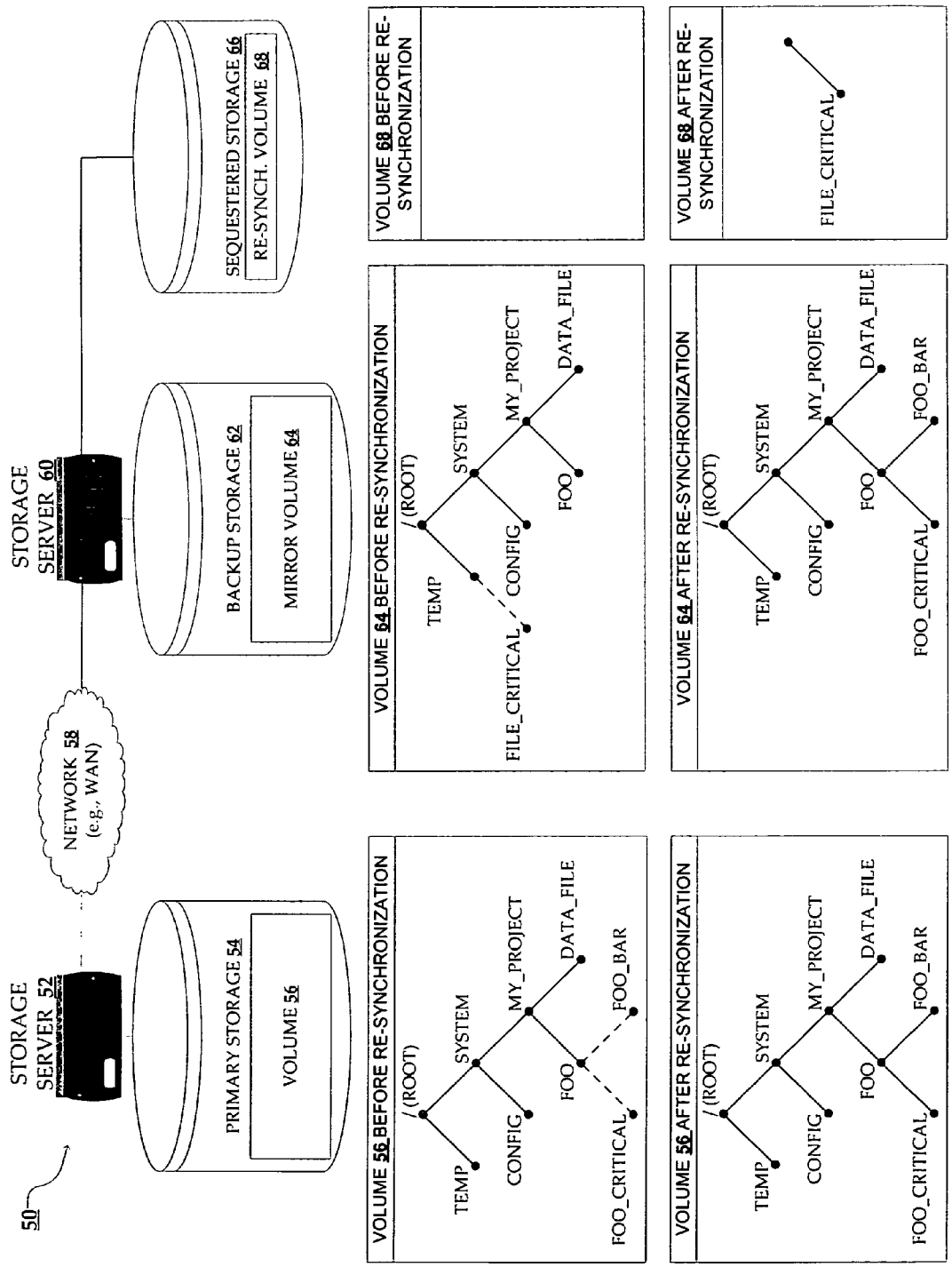
FIG. 4 illustrates a simplified network storage system, according to one embodiment of the invention, for re-synchronizing a broken asynchronous data mirror while preserving unique data.
Figure 5:
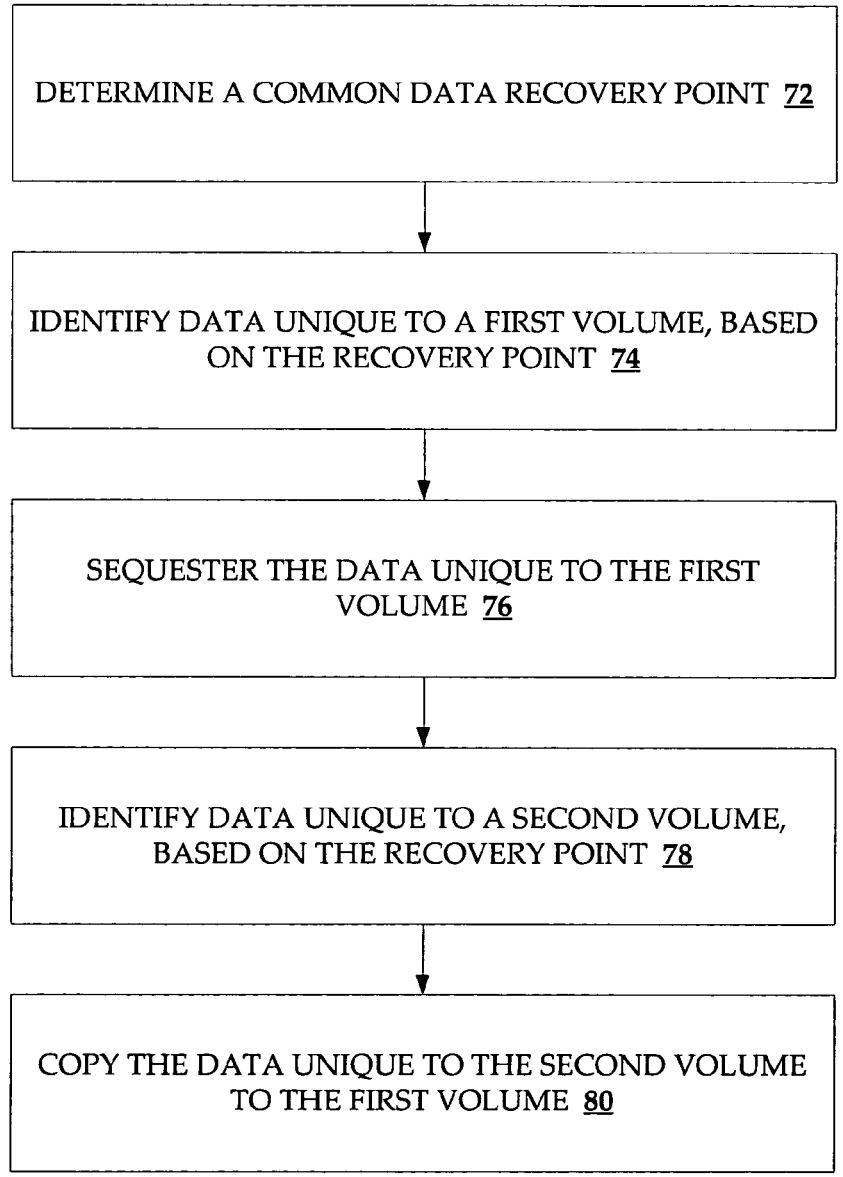
FIG. 5 illustrates the operations for a method, according to an embodiment of the invention, for re-synchronizing an asynchronous data mirror while preserving unique data.

FIGS. 4 and 5 illustrate a system and method, respectively, for re-synchronizing a broken asynchronous data mirror, according to an embodiment of the present invention. FIG. 4 illustrates a simplified network storage system 50, according to one embodiment of the invention, capable of re-synchronizing a broken asynchronous data mirror while preserving unique data. As illustrated in FIG. 4, the network storage system 50 includes a first storage server 52 with a primary storage device 54 including a first volume 56. The first storage server 52 and attached primary storage device 54 are connected via a network (e.g., a wide area network (WAN) 58) to a second storage server 60 having a secondary storage device 62 with a second volume (e.g., mirror volume 64). Accordingly, the system 50 may be configured so that the second volume 64 is a "mirror" of the first volume 56.

In addition, the storage system 50 includes a sequestered data storage device 66 with a third volume 68. In FIG. 4, the sequestered data storage device 66 is shown connected to the second storage server 60 with the attached backup storage device 62. However, it will be appreciated that in alternative embodiments, the sequestered data storage device 66 may be connected directly to the first storage server 52 with the primary storage device 54, or it may be attached to a separate storage server (not shown). Furthermore, as demonstrated by the before and after illustrations of the directory structures in FIG. 4, the first volume 56 on the primary storage device 54 and the second volume 64 on the backup storage device 62 make up a broken asynchronous data mirror. That is, in the illustrations showing the directory structures before synchronization, the first volume 56 on the primary storage device 54 contains unique data, for example, the files with filenames FOO_CRITICAL and FOO_BAR. Similarly, the second volume 64 on the secondary storage device 62 also contains unique data, for example, the file with filename FILE_CRITICAL.

FIG. 5 illustrates the operations for a method 70, according to an embodiment of the invention, for re-synchronizing an asynchronous data mirror, such as that illustrated in FIG. 4. According to the method 70 illustrated in FIG. 5, at operation 72, a common data recovery point is determined. For example, in one embodiment of the invention a re-synchronization application executing on the first storage server 52 analyzes an activity log to determine the last time a synchronization operation occurred between the two volumes 56 and 64 making up the broken asynchronous data mirror. In an alternative embodiment, the re-synchronization application analyzes data on the two volumes 56 and 64 to determine the common data recovery point. In any case, as described below, the common data recovery point is used to identify data that is unique to volume 56, and/or the mirror volume 64.

At operation 74, the mirror volume 64 on the backup storage 62 is analyzed to identify data unique to that volume 64. For example, referring again to FIG. 4, on the first volume (e.g., the mirror volume 64), the file with the filename FILE_CRITICAL is unique (e.g., not included on the volume 56 of the primary storage device). In one embodiment of the invention, unique data are identified by checking metadata attributes and determining whether files, or directories, were modified or created after the common data recovery point determined at operation 72. In an alternative embodiment, identifying unique data may be accomplished using a type of brute force algorithm that compares data on the first volume 56 to data on the second volume 64.

At operation 76, the data on the first volume (e.g., the mirror volume 64) that is identified as unique in operation 74 is sequestered. For example, in one embodiment of the invention, the unique data from the mirror volume 64 may be copied to a third volume (e.g., the re-synchronization volume 68) on a re-sequestered data storage device 66. Furthermore, in one embodiment of the invention, if the first volume is a WORM (write-once, read-many) volume, when the unique data is copied to the third volume 68, the WORM attributes of the data are preserved. Moreover, the data may be written in a non-proprietary format, making it possible to retrieve and view the data with standardized data access applications.

At operation 78, data unique to the second volume (e.g., volume 56 on the primary storage device) is identified. In one embodiment of the invention, the unique data on the second volume 56 is again identified based on the common data recovery point determined in operation 72. For example, referring again to the directory structures in FIG. 4, the files FOO_CRITICAL and FOO_BAR may be identified as unique based on their file attributes indicating the time each file was created or last modified. If, for example, either of the files was created or modified after the common data recovery point (e.g., the point in time of the last successful mirror synchronization operation), at operation 76, the files will be identified as being unique to the second volume 56.

Accordingly, at operation 80, all data that is unique to the second volume 56 is copied to the first volume 64 on the backup storage device 62. As illustrated in FIG. 4, after re-synchronization, the directory structure on the mirror volume 64 is a mirror image of the directory structure on the second volume 56. Moreover, the file FILE_CRITICAL, which before re-synchronization was on the mirror volume with reference number 64, has been copied to the third volume (e.g., re-synchronization volume 68) on the sequestered data storage device 66.

Although the example described with reference to FIG. 5 refers to data unique to the first volume (e.g., the mirror volume 64) being sequestered, it will be appreciated that data unique to the second volume (e.g., volume 56 on the primary storage) may be sequestered as well. For example, referring again to FIG. 5, it may be preferable to re-synchronize the two volumes 56 and 64 by copying data from the mirror volume 64 to the volume 56 on the primary storage device 54. In such case, data unique to the second volume 56 may be sequestered by copying it to the third volume 68.

Figure 6:
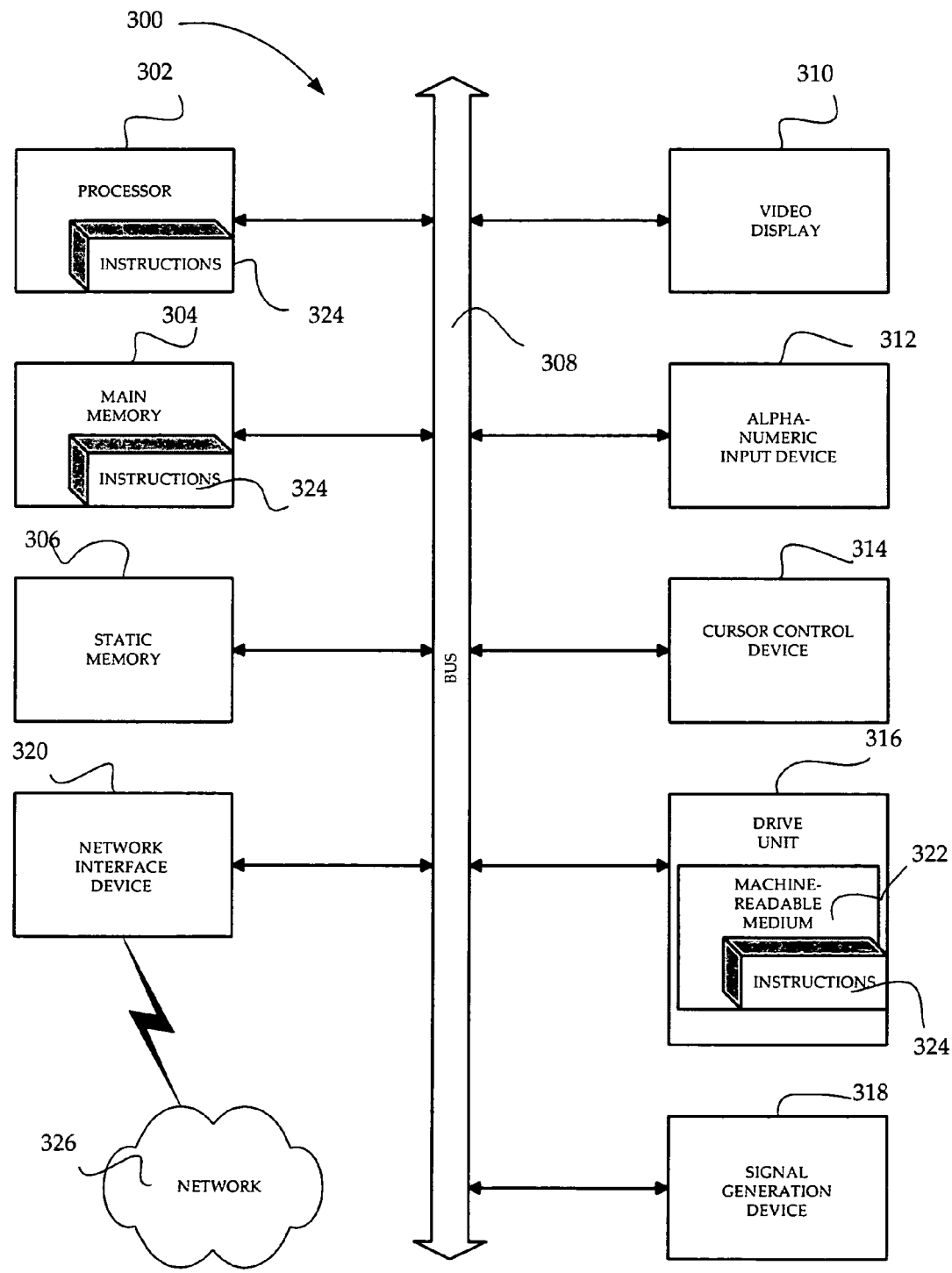
FIG. 6 shows a diagrammatic representation of a machine in the form of a computer system within which a set of instructions, for causing the machine to perform any one or more of the methodologies discussed herein, may be executed.

FIG. 6 shows a diagrammatic representation of a machine in the exemplary form of a computer system 300 within which a set of instructions, for causing the machine to perform any one or more of the methodologies discussed herein, may be executed. In alternative embodiments, the machine operates as a standalone device or may be connected (e.g., networked) to other machines. In a networked deployment, the machine may operate in the capacity of a server or a client machine in a client-server network environment, or as a peer machine in a peer-to-peer (or distributed) network environment. The machine may be a server computer, a client computer, a personal computer (PC), a tablet PC, a set-top box (STB), a Personal Digital Assistant (PDA), a cellular telephone, a web appliance, a network router, switch or bridge, or any machine capable of executing a set of instructions (sequential or otherwise) that specify actions to be taken by that machine. Furthermore, while only a single machine is illustrated, the term "machine" shall also be taken to include any collection of machines that individually or jointly execute a set (or multiple sets) of instructions to perform any one or more of the methodologies discussed herein.

The computer system 300 may include a processor 302 (e.g., a central processing unit (CPU) a graphics processing unit (GPU) or both), a main memory 304 and a static memory 306, which communicate with each other via a bus 308. The computer system 300 may further include a video display unit 310 (e.g., a liquid crystal display (LCD) or a cathode ray tube (CRT)). The computer system 300 also may include an alpha-numeric input device 312 (e.g., a keyboard), a cursor control device 314 (e.g., a mouse), a disk drive unit 316, a signal generation device 318 (e.g., a speaker) and a network interface device 320, including a data switching device such as a fibre channel data switching device.

The disk drive unit 316 includes a machine-readable medium 322 on which is stored one or more sets of instructions (e.g., software 324) embodying any one or more of the methodologies or functions described herein. The software 324 may also reside, completely or at least partially, within the main memory 304 and/or within the processor 302 during execution thereof by the computer system 300, the main memory 304 and the processor 302 also constituting machine-readable media.

The software 324 may further be transmitted or received over a network 326 via the network interface device 320.

While the machine-readable medium 322 is shown in an exemplary embodiment to be a single medium, the term "machine-readable medium" should be taken to include a single medium or multiple media (e.g., a centralized or distributed database, and/or associated caches and servers) that store the one or more sets of instructions. The term "machine-readable medium" shall also be taken to include any medium that is capable of storing, encoding or carrying a set of instructions for execution by the machine and that cause the machine to perform any one or more of the methodologies of the present invention. The term "machine-readable medium" shall accordingly be taken to include, but not be limited to, solid-state memories, optical and magnetic media, and carrier wave signals.

Thus, a method and system are provided with reference to specific embodiments. It will be evident that various modifications and changes may be made to theses embodiments without departing from the broader spirit and scope of the invention. Accordingly, the specification and drawings are to be regarded in an illustrative rather than a restrictive sense.

What is claimed is:

1. A method comprising:
sequestering all application data unique to a first volume, wherein sequestering all application data that is unique to the first volume includes:
identifying all application data included on the first volume and not on the second volume; and
copying the application data included on the first volume and not on the second volume to a third volume;
eliminating all application data unique to the first volume; and
copying all application data unique to a second volume to the first volume to re-synchronize a broken asynchronous data mirror comprising the first volume.

2. The method of claim 1, wherein the application data's access and permanence attributes are retained when sequestered and/or copied.

3. The method of claim 1, wherein the first volume is stored on a first storage device, and the second volume is stored on a second storage device.

4. The method of claim 3, wherein application data unique to the first volume is application data that has been created or modified on the first volume subsequent to a last synchronization operation to synchronize the second volume with the first volume.

5. The method of claim 3, wherein application data unique to the second volume is application data that has been created or modified on the second volume subsequent to a last synchronization operation to synchronize the second volume with the first volume.

6. The method of claim 3, wherein copying the application data included on the first volume and not on the second volume to a third volume includes:
writing the data included on the first volume and not on the second volume to a third volume in a non-proprietary format, the third volume on a third storage device.

7. The method of claim 6, wherein the first volume, the second volume, and the third volume are WORM volumes, and sequestering all application data unique to the first volume includes preserving the WORM attributes of the application data when writing the application data included on the first volume and not on the second volume to a third volume in a non-proprietary format.

8. The method of claim 3, further comprising:
analyzing the first volume and/or the second volume to determine a data recovery point, the data recovery point indicating the time at which the last synchronization operation completed successfully, wherein said identifying all application data included on the first volume and not on the second volume includes identifying application data written to the first volume after the data recovery point.

9. The method of claim 3, wherein copying all application data unique to the second volume to the first volume, includes:
 identifying all application data included on the second volume and not on the first volume; and
 copying the application data included on the second volume and not on the first volume to the first volume.

10. The method of claim 9, wherein copying the application data included on the second volume and not on the first volume to the first volume, includes:
 writing the application data included on the second volume and not on the first volume to the first volume in a non-proprietary format.

11. The method of claim 10, wherein the first volume, the second volume and the third volume are WORM volumes, and copying all application data unique to the second volume to the first volume includes preserving the WORM attributes of the application data when writing the application data included on the second volume and not on the first volume to the first volume in a non-proprietary format.

12. The method of claim 11, further comprising:
 analyzing the first volume and/or the second volume to determine a data recovery point, the data recovery point indicating the time at which the last synchronization operation completed successfully, wherein said identifying all application data included on the second volume and not on the first volume includes identifying all application data written to the second volume after the data recovery point.

13. A system comprising:
 a server;
 a primary storage device connected to the server;
 a secondary storage device connected to the primary storage device; and
 a re-synchronization storage device connected to the primary storage device, wherein the server, upon detecting a broken asynchronous data mirror between a first volume on the primary storage device and a second volume on the secondary storage device, is to:
 identify all application data included on the first volume and not on the second volume;
 copy the application data included on the first volume and not on the second volume to a third volume on the re-synchronization storage device;
 remove, from the first volume, the application data included on the first volume and not on the second volume;
 identify application all data included on the second volume and not on the first volume; and
 copy the application data included on the second volume and not on the first volume to the first volume.

14. The system of claim 13, wherein the first storage device is connected to the second storage device via a network.

15. The system of claim 13, further comprising multiple primary storage devices and multiple secondary storage devices, wherein the first volume spans multiple primary storage devices and the second volume spans multiple secondary storage devices.

16. The system of claim 13, further comprising a fibre channel switching device connecting the server to the primary storage device, the secondary storage device, and the re-synchronization storage device, wherein the server provides block level access to the primary storage device, the secondary storage device and the resynchronization storage device.

17. The system of claim 13, wherein the server is to identify application data unique to the first volume as application data that has been created or modified on the first volume subsequent to a last synchronization operation to synchronize the second volume with the first volume.

18. The system of claim 13, wherein the server is to identify application data unique to the second volume as application data that has been created or modified on the second volume subsequent to a last synchronization operation to synchronize the second volume with the first volume.

19. The system of claim 13, wherein the server is to:
 write the application data included on the first volume and not on the second volume to the third volume in a non-proprietary format; and
 write the application data included on the second volume and not on the first volume to the third volume in a non-proprietary format.

20. The system of claim 13, wherein the first volume, the second volume, and the third volume are WORM volumes, and the server is to preserve the WORM attributes of the application data when copying the application data included on the first volume and not on the second volume to a third volume on the re-synchronization storage device.

21. The system of claim 13, wherein the first volume, the second volume and the third volume are WORM volumes, and the server is to preserve the WORM attributes of the application data when copying the application data included on the second volume and not on the first volume to the first volume.

22. A system comprising:
 data management means for writing data to, and reading data from, a storage device;
 a primary data storage device connected to the data management means;
 a secondary storage device connected to the primary storage device and the data management means; and
 a re-synchronization data storage device connected to the primary data storage device, the secondary data storage device, and the data management means, wherein the data management means, upon detecting a broken asynchronous data mirror between a first volume on the primary data storage device and a second volume on the secondary data storage device, is to:
 identify all application data included on the first volume and not on the second volume;
 copy the application data included on the first volume and not on the second volume to a third volume on the re-synchronization data storage device;
 remove, from the first volume, the application data included on the first volume and not on the second volume;
 identify all application data included on the second volume and not on the first volume; and
 copy the application data included on the second volume and not on the first volume to the first volume.

23. The system of claim 22, wherein the primary data storage device, the secondary data storage device, and the re-synchronization data storage device comprise a storage area network, and the data management means includes data switching means for routing application data to the primary data storage device, the secondary data storage device, and the re-synchronization data storage device.

24. A machine-readable storage medium embodying instructions for facilitating the re-synchronization of a broken asynchronous data mirror, the instructions, when executed by a machine, cause the machine to:

identify, in response to detecting the broken asynchronous data mirror between a first volume and a second volume, all application data included on the first volume and not on the second volume, the first volume stored on a first storage device and the second volume stored on a second storage device;

copy the application data included on the first volume and not on the second volume to a third volume, the third volume stored on a re-synchronization storage device;

remove, from the first volume, the application data included on the first volume and not on the second volume;

identify all application data included on the second volume and not on the first volume; and copy the application data included on the second volume and not on the first volume to the first volume.

* * * * *